(12) United States Patent
Nerb

(10) Patent No.: US 8,298,309 B2
(45) Date of Patent: Oct. 30, 2012

(54) LIQUID SEPARATOR AND TANK SYSTEM COMPRISING A LIQUID SEPARATOR

(75) Inventor: Josef Nerb, Lenting (DE)

(73) Assignee: Deutsche Transalpine Oelleitung GmbH, Kosching (DE)

(*) Notice: Subject to any disclaimer, the term of this patent is extended or adjusted under 35 U.S.C. 154(b) by 442 days.

(21) Appl. No.: 12/526,169

(22) PCT Filed: Nov. 15, 2007

(86) PCT No.: PCT/EP2007/062404
§ 371 (c)(1), (2), (4) Date: Oct. 5, 2009

(87) PCT Pub. No.: WO2008/095556
PCT Pub. Date: Aug. 14, 2008

(65) Prior Publication Data
US 2010/0275783 A1     Nov. 4, 2010

(30) Foreign Application Priority Data
Feb. 6, 2007 (DE) .......................... 10 2007 000 076

(51) Int. Cl.
*B01D 45/08* (2006.01)
(52) U.S. Cl. ............... 55/462; 55/463; 55/424; 55/426; 55/385.1; 55/385.4; 96/220

(58) Field of Classification Search .................. 55/462, 55/463, 424, 426, 385.1, 385.4; 96/220
See application file for complete search history.

(56) References Cited

U.S. PATENT DOCUMENTS

| | | | |
|---|---|---|---|
| 443,328 A | 12/1890 | McGowan | |
| 1,773,073 A | 8/1930 | Beach | |
| 3,362,139 A * | 1/1968 | Williamson | ............. 55/385.1 |
| 4,175,937 A | 11/1979 | Brandau | |
| 4,933,047 A | 6/1990 | Bannon | |
| 5,019,141 A | 5/1991 | Granville | |
| 2008/0264018 A1 * | 10/2008 | Herman | ........................ 55/462 |

FOREIGN PATENT DOCUMENTS

| | | |
|---|---|---|
| DE | 19510821 A1 | 10/1996 |
| WO | 9408502 A | 4/1994 |
| WO | 0232546 A | 4/2002 |

* cited by examiner

*Primary Examiner* — Jason M Greene
*Assistant Examiner* — Dung H Bui
(74) *Attorney, Agent, or Firm* — Baker & Hostetler LLP

(57) ABSTRACT

A liquid separator for separating a liquid from a gas flow comprising a housing (1) includes a baffle plate (4) provided between an upper housing portion (1A) and a lower housing portion (1B). The baffle plate prevents liquid contained in the gas flow from escaping from the liquid separator. Liquid separated at the baffle plate (4) is returned to the inlet (2) of the liquid separator.

10 Claims, 4 Drawing Sheets

LIQUID SEPARATOR AND TANK SYSTEM COMPRISING A LIQUID SEPARATOR

CROSS-REFERENCE TO RELATED APPLICATIONS

This application is a National Stage of International patent application PCT/EP2007/062404 filed on Nov. 15, 2007, which claims priority to foreign patent application DE 10 2007 000076.8, filed on Feb. 6, 2007, the disclosures of which are incorporated herein by reference in their entirety.

FIELD OF THE INVENTION

The present invention relates to a liquid separator for separating a liquid from a gas flow and a tank system comprising such liquid separator.

BACKGROUND OF THE INVENTION

When storing liquids, the problem arises that escaping gaseous substances can entrain the liquid so that, apart from the pollution of the pertinent apparatus, also sources of danger may occur. For instance, when storing oil in large-volume tanks, there is a risk of oil being entrained because of ascending air or gas bubbles. This problem is especially relevant to tanks in which two preconditions are fulfilled:

The tank has a quite large construction height and introduced liquid is supplied to the lower portion of the tank. In this way, a more or less strong degasification of the oil results from the pressure drop when the liquid moves upward. Moreover, large gas bubbles entering the venting system at high velocity may form.

The ceiling of the tank is arranged very closely to the stored oil. Especially in the case of floating roof tanks having ceilings located on the oil surface the problem of the ascending gas bubbles entraining the oil into the vent openings arises.

So far complex liquid separating systems have been used in process engineering. These systems are frequently provided either with movable elements or with complex valves.

In those systems including valves or movable elements the risk of pollution and clogging, especially by viscous fluids, occurs. Then the venting function cannot be guaranteed any more.

SUMMARY OF THE INVENTION

It is the object of the present invention to provide a liquid separator which can be manufactured by most simple means and is operable without major maintenance effort. It is also the object of the present invention to provide a liquid separator which is adapted to be supplemented to existing plants in a simple manner.

The object is achieved by a liquid separator for separating a liquid from a gas flow that includes a housing formed by an upper housing portion and a lower housing portion, which, with regard to an alignment in an operating state, has an inlet opening at the lower housing portion and an outlet opening at the upper housing portion; a deflecting plate provided in the housing between the inlet opening and the outlet opening, the deflecting plate preventing the liquid entrained by the gas flow from exiting through the outlet opening in that the entrained liquid deflects onto the deflecting plate and is returned into the inlet opening due to gravity; wherein the housing and the deflecting plate are rotationally symmetric and the axis of symmetry is aligned substantially vertically during operation of the liquid separator; wherein the deflecting plate is fixed to the housing such that it is spaced apart from an inner wall of the housing to form an annular gap between the inner wall of the housing and the circumference of the deflecting plate through which the gas flow passes during operation of the liquid separator; wherein the upper housing portion and the lower housing portion each define conical elements having a large diameter portion and a small diameter portion, the housing being formed by connecting the large diameter portions of the upper housing portion and of the lower housing portion and the inlet opening and the outlet opening being formed at the small diameter portion of the lower housing portion and the upper housing portion, respectively; and wherein the deflecting plate has the shape of a cone that is downwards inclined towards the large diameter portion of the upper and lower housing portions in an operating position of the liquid separator.

In accordance with the invention, a liquid separator for separating a liquid from a gas flow is provided comprising a housing that includes an inlet at a lower housing portion and an outlet at an upper housing portion. In the housing a baffle plate is provided between the inlet and the outlet preventing liquid contained in the gas flow from escaping through the outlet.

By the design of the liquid separator according to the invention sufficient ventilation can be provided and simultaneously the liquid contained in the gas flow can be prevented from escaping. The baffle plate and the specific design of the liquid separator effectuate that the liquid contained in the gas flow is separated at said baffle plate and is returned to the inlet.

In accordance with a further advantageous embodiment of the invention, the housing and the baffle plate have a rotation-symmetric design and the axis of symmetry is aligned substantially vertically during operation of the liquid separator. In this manner the design of the liquid separator is simplified and also the assembly of the individual components can be precisely implemented.

In accordance with a further advantageous embodiment of the invention, the housing is formed of the upper housing portion and the lower housing portion. The housing comprises two housing halves which are interconnected. Therefore, in the event of clogging or damage, the liquid separator can be opened and maintained by simple means.

In accordance with a further advantageous embodiment of the present invention, each of the housing portions consists of conical elements. Conical elements permit an expansion of the cross-section for accommodating the baffle plate. Further, by the expanded cross-section the flow resistance of the gas flow is reduced.

In accordance with a further advantageous embodiment of the invention, the housing portions have a large-diameter portion and a small-diameter portion, the housing being formed by connecting the large-diameter portions of the upper housing portion and the lower housing portion. The connection of the conical elements ensures a safe return of the separated liquid to the inlet. The connection can be made by screws or other connecting means. Preferably, the connection should be detachable.

In accordance with a further advantageous embodiment of the invention, the baffle plate is shaped as a cone which is downwards inclined to the outer diameter direction in the operating position of the liquid separator. This enables the separated liquid to be returned to the inlet. Due to the resulting geometry, the separating efficiency at the baffle plate can moreover be increased and, at the same time, the manufacturing effort is reduced.

In accordance with a further advantageous embodiment of the invention, the baffle plate and/or the housing portions consist of a thin-walled material. Especially the baffle plate and/or the housing portions are advantageously made of sheet metal. The manufacture of elements of thin-walled material or sheet metal is standardized and inexpensive.

In accordance with a further advantageous embodiment of the invention, the baffle plate includes a draining extension. The draining extension is preferably provided at the lower end of the baffle plate. With the aid of the draining extension a defined draining of the separated liquid is permitted. Thus, the separating efficiency of the liquid separator can be increased.

In accordance with a further advantageous embodiment of the invention, the draining extension has a circular shape at the edge of the baffle plate and is aligned substantially downwards. This configuration of the draining extension permits a maximum surface and circumferential length, respectively, at which defined draining is facilitated. Further, the edge of the baffle plate at the same time constitutes the lowest area. In this way, the separating efficiency of the liquid separator can be improved.

In accordance with a further advantageous embodiment of the invention, the baffle plate is fastened to the upper and/or the lower housing portion. The defined alignment of the baffle plate with respect to the housing portions is thus guaranteed. Furthermore, the liquid separator can be constructed by simple means.

In accordance with a further advantageous embodiment of the invention, the baffle plate is fastened to the housing so that it is spaced apart from the inner wall of the housing. Especially between the inner wall of the housing and the circumference of the baffle plate an annular gap is formed through which the gas flow can escape during operation of the liquid separator. This configuration permits low flow resistance with a simultaneously high separating efficiency.

In accordance with a further advantageous embodiment of the invention, the baffle plate divides the interior of the housing into an upper volume above the baffle plate and a lower volume below the baffle plate, the ratio of the upper volume to the lower volume being approximately 1:3. This division facilitates defined flow rates of the gas flow so that the liquid contained in the gas flow can be safely separated at the baffle plate, the flow resistance at the same time being kept sufficiently low.

In accordance with a further advantageous embodiment of the invention, at the lower end of the housing a flange is provided and at the upper end of the housing another flange is provided. According to the invention, the mounting dimensions of the flanges are identical. This facilitates inserting the liquid separator in an existing pipe system without the pipe diameter of the existing pipe system having to be adapted. Rather, the existing system can be supplemented by cutting a pipe connection and inserting the liquid separator.

According to the invention, the liquid separator is configured to free a gas flow containing a liquid and extending from the inlet to the outlet from the liquid by separating the liquid at the baffle plate and returning it to the inlet via the draining extension.

In accordance with a further advantageous embodiment of the invention, the ratio of a through area between the baffle plate and the inner wall of the housing and a through area at the inlet is at least 3:1. Said through area is the area through which the gas flow passes substantially vertically. Thereby the separating efficiency can be improved while the pressure loss is minimized. Moreover, the risk of clogging or damage by pollution is reduced. The best results are obtained especially at a ratio of 3:1.

In accordance with a further advantageous embodiment of the invention, a liquid separator system comprising a liquid separator is provided which is constructed according to one or a combination of plural of the afore-mentioned embodiments of the invention, the liquid separator system additionally including a flame retardant member provided at the flange at the upper end of the housing of the liquid separator, wherein the gas flow can escape from the flame retardant member and flames or ignition sources are prevented from penetrating the flame retardant member. A flame retardant member generally consists of a close-meshed metallic material, such as a grid or the like. In this way, the function of the flame retardant member is advantageously maintained in a simple manner by preventing the liquid from entering from the ventilation by providing the liquid separator in a liquid separating system of this type.

In accordance with a further advantageous embodiment of the invention, a tank system is provided having a tank that includes a closed ceiling wall and a venting or degassing port in the ceiling wall. At least one liquid separator constructed according to one or a combination of plural of the afore-described embodiments of the invention, or at least one liquid separator system as described before, is positioned at the venting or degassing port.

In accordance with a further advantageous embodiment of the invention, a float is provided at the ceiling wall in the aforementioned tank system so that the ceiling wall is held on the liquid surface. Herefrom the function of a floating roof tank is resulting to which the present invention can be most efficiently applied.

The aforementioned features of the invention may be combined in a reasonable way so that especially advantageous effects are resulting.

BRIEF DESCRIPTION OF THE DRAWINGS

The invention is best illustrated when viewing the drawings in combination with the corresponding description of the embodiment.

DETAILED DESCRIPTION

An embodiment of the invention is described with reference to the figures.

Figure 1:
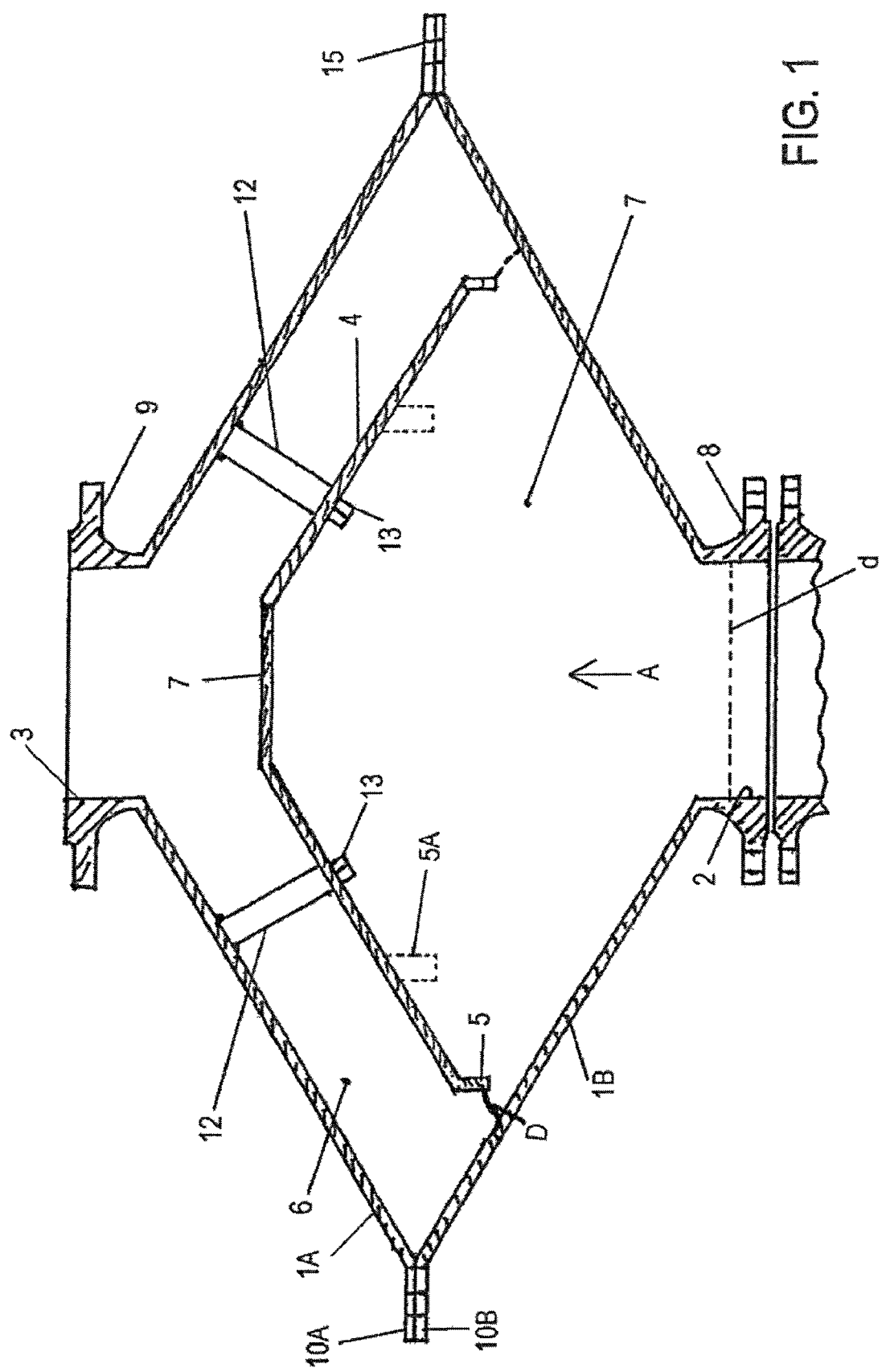
FIG. 1 shows a longitudinal sectional view of the liquid separator according to an embodiment of the present invention.
Figure 2:
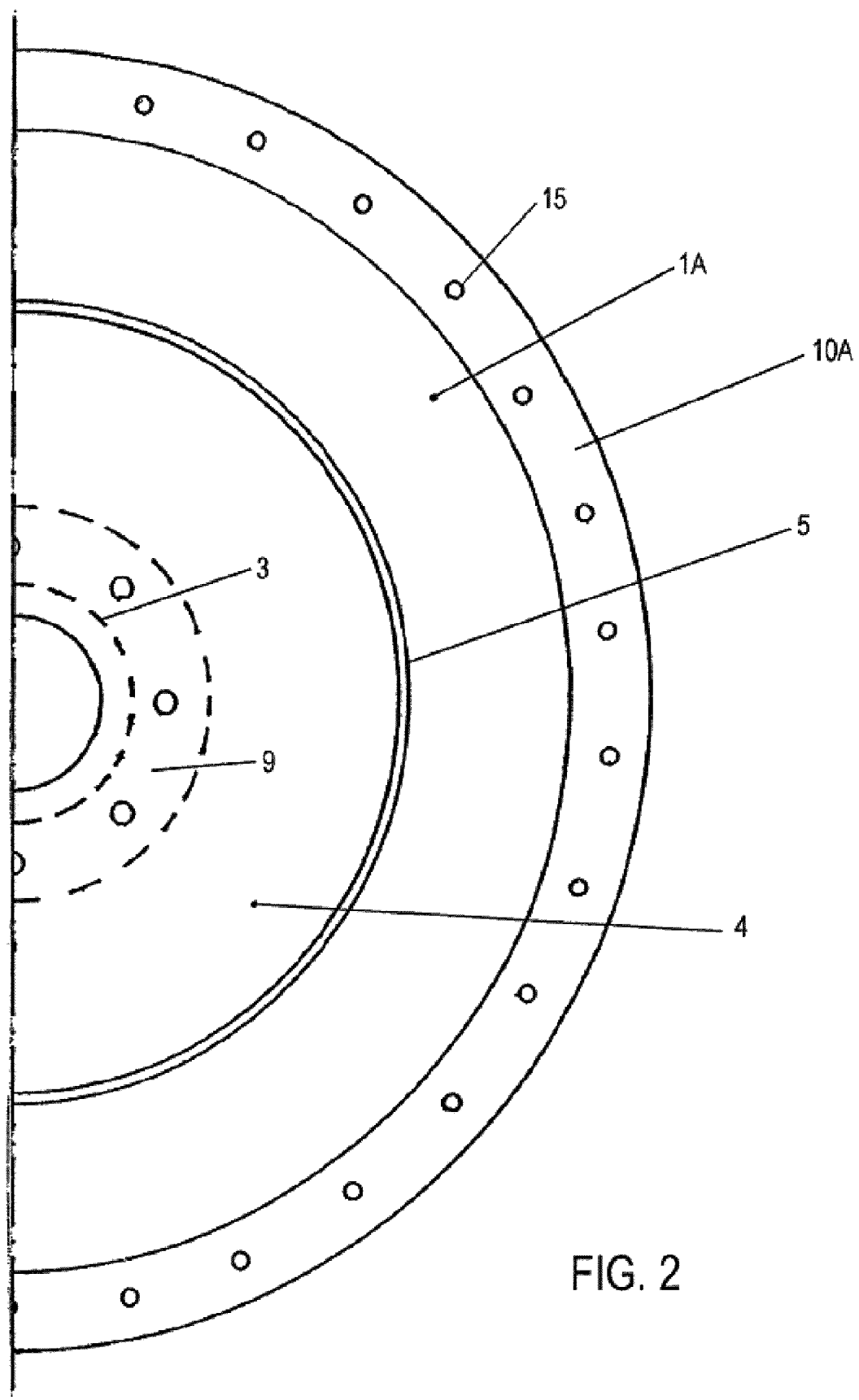
FIG. 2 shows a detail of the liquid separator according to the present invention.

FIG. 1 shows a longitudinal sectional view of the liquid separator according to the invention. FIG. 2 illustrates a detail of the liquid separator of FIG. 1 in a view in the direction of the arrow A with a distant lower housing portion.

The shown liquid separator 1 includes an upper housing portion 1A, a lower housing portion 1B and a baffle plate 4 being the substantial elements. The upper housing portion 1A is connected to the lower housing portion 1B at the respective large-diameter flange portions 10A, 10B. The flange portions include plural concurrent bores 15 into which screws 16 can be inserted to connect the upper and lower housing portions 1A, 1B.

Inside the housing of the liquid separator the baffle plate 4 is provided. The baffle plate on the whole is a cone whose surface is downwards inclined in a radial area. The housing and the baffle plate 4 are manufactured of sheet metal, preferably of sheet steel. The baffle plate 4 is mounted to the upper housing portion 1A. In the upper area of the baffle plate 4 a flattened portion 7 is provided to spare the space in the area of the outlet 3.

At the inside of the upper housing portion 1A bolts 12 projecting into the interior of the housing are welded for mounting the baffle plate. The bolts 12 have female threads into which screws 13 are screwed. The screws 13 are guided through the bores in the baffle plate 4 so that the baffle plate is held by the bolts 12.

A draining extension 5 is provided at the outer circumference of the baffle plate. The draining extension is formed integrally with the baffle plate 4 so that an annular projection is aligned to be downwards protruding. Said draining extension 5 forms a circular ring at the outer edge of the baffle plate.

Alternatively, another draining extension 5A may be provided which projects from the downwards facing surface of the baffle plate 4 and is equally configured as a circular ring.

The housing has an inlet 2 and an outlet 3. A flange 8 is formed at the inlet. In this case the flange 8 is a standardized component tightly welded to the lower housing portion 1B.

The invention is not restricted to the afore-described embodiment. Various modifications can be made as long as the basic principle of the invention is realized. Especially the flanges 8 and 9 need not be identical. Furthermore, the draining extension 5 or 5A need not be a continuous circular ring. Individual extensions facilitating a defined draining of the liquid may be provided at the baffle plate 4. The baffle plate 4 need not be screwed to the bolts 12. Rather, the baffle plate 4 can be completely welded to the bolt 12. It is preferred, however, to connect the baffle plate 4 detachably to the housing so as to permit maintenance of the system. The flanges 8 and 9 of the housing can also be welded to each other. It is preferred, however, to provide a detachably screwed connection so as to simplify the assembly and to facilitate later maintenance of the system.

Figure 3:
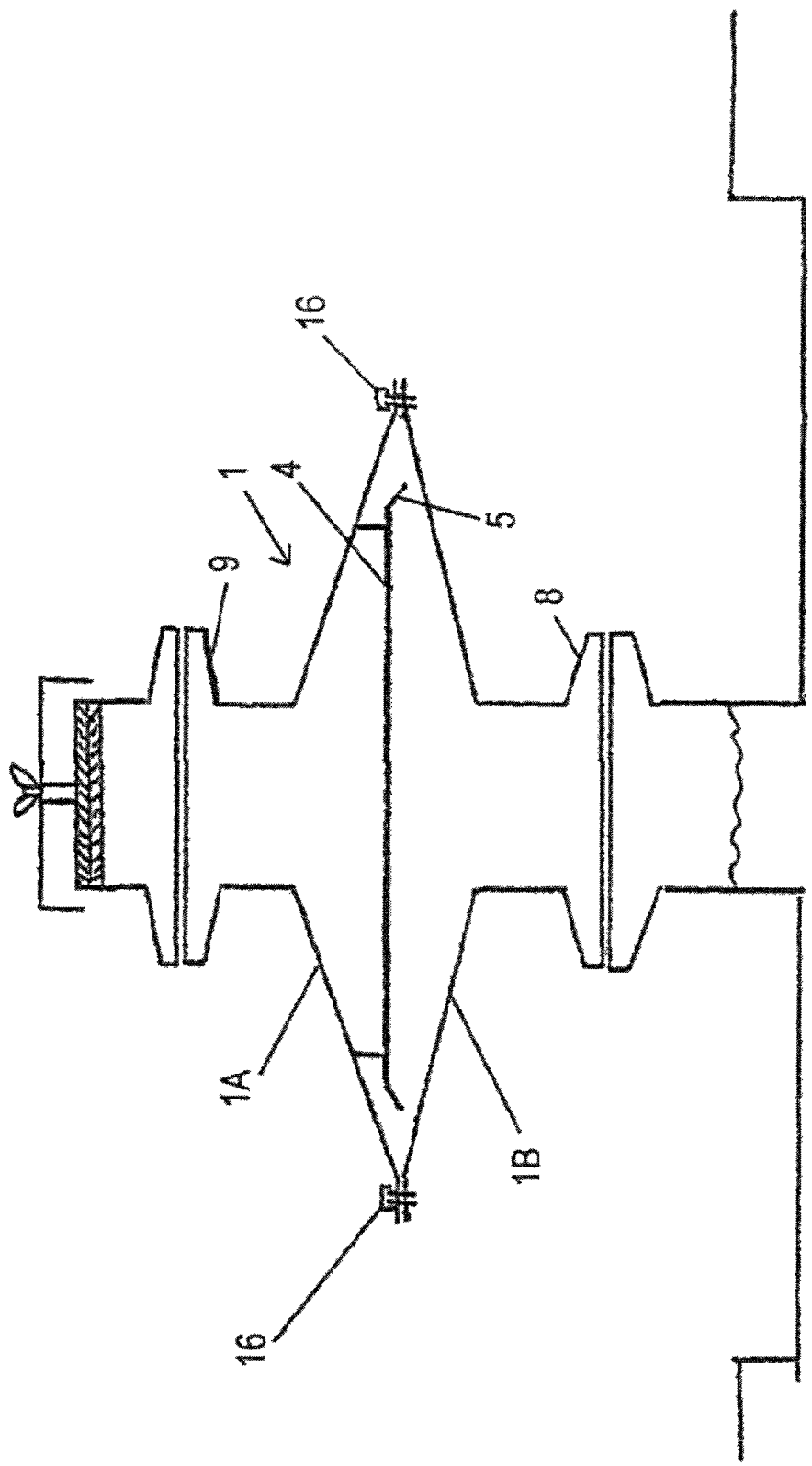
FIG. 3 shows a longitudinal sectional view of a liquid separator system according to the invention.
Figure 4:
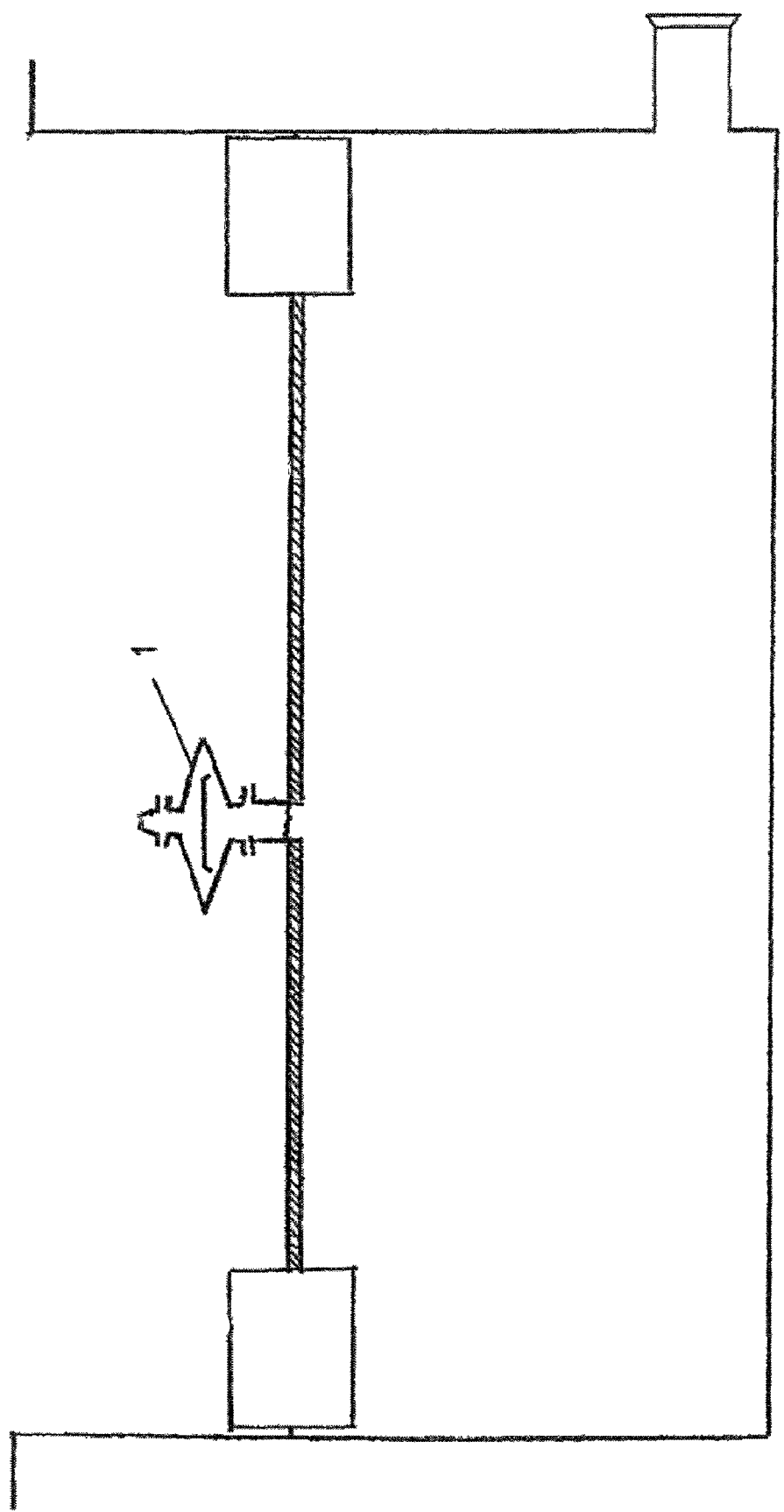
FIG. 4 shows a tank system comprising a liquid separator according to the present invention.

The liquid separator can be used in all systems in which a gas flow may contain liquid components which have to be removed from said gas flow. Especially the liquid separator can be used without the flame retardant shown in FIG. 3 or 4.

What is claimed is:

1. A liquid separator for separating a liquid entrained by a gush-like gas flow, comprising:
    a housing formed by an upper housing portion and a lower housing portion, which, with regard to an alignment in an operating state, has an inlet opening at the lower housing portion and an outlet opening at the upper housing portion;
    a deflecting plate provided in the housing between the inlet opening and the outlet opening, the deflecting plate preventing the liquid entrained by the gas flow from exiting through the outlet opening in that the entrained liquid deflects onto the deflecting plate and is returned into the inlet opening due to gravity;
    wherein the housing and the deflecting plate are rotationally symmetric and the axis of symmetry is aligned substantially vertically during operation of the liquid separator;
    wherein the deflecting plate is fixed to the housing such that it is spaced apart from an inner wall of the housing to form an annular gap between the inner wall of the housing and the circumference of the deflecting plate through which the gas flow passes during operation of the liquid separator;
    wherein the upper housing portion and the lower housing portion each define conical elements having a large diameter portion and a small diameter portion, the housing being formed by connecting the large diameter portions of the upper housing portion and the lower housing portion and the inlet opening and the outlet opening being formed at the small diameter portion of the lower housing portion and the upper housing portion, respectively; and
    wherein the deflecting plate has the shape of a cone that is downwards inclined towards the large diameter portion of the upper and lower housing portions in an operating position of the liquid separator.

2. The liquid separator according to claim 1, wherein the deflecting plate and/or the housing portions consist of a thin-walled material, in particular metal sheet.

3. The liquid separator according to claim 1, wherein the deflecting plate is fixed to one or both of the upper and lower housing portions and comprises a draining extension provided at the lower end of the deflecting plate.

4. The liquid separator according to claim 3, wherein the drip lip is circularly formed at the edge of the deflecting plate and is aligned substantially downwards.

5. The liquid separator according to claim 1, wherein the deflecting plate divides the inner space of the housing into an upper volume above the deflecting plate and a lower volume below the deflecting plate, and
    wherein the ratio of the upper volume to the lower volume is approximately 1:3, and/or the ratio of a first passage area between the deflecting plate and the inner wall of the housing to a second passage area in the inlet opening is at least 3:1.

6. The liquid separator according to claim 1, wherein a first flange is provided at the lower end of the housing and a second flange is provided at the upper end of the housing, wherein the connection dimensions of the first and second flanges are identical.

7. The liquid separator according to claim 3, wherein the liquid separator is configured to remove the liquid from a liquid-containing gas flow, which extends from the inlet opening to the outlet opening, by separating the liquid at the deflecting plate and returning it to the inlet opening via the draining extension.

8. A liquid separator system comprising:
    a liquid separator according to claim 1; and
    a flame protection element provided at a flange at an upper end of the housing, wherein the gas flow can exit from the flame protection element and an intrusion of flames or ignition sources into the flame protection element is prevented.

9. A tank system comprising:
    a tank having a closed ceiling wall and a ventilation or degassing port in the ceiling wall, wherein at least a liquid separator according to claim 1 is attached to the ventilation or degassing port.

10. The tank system according to claim 9, wherein the ceiling wall further comprises a floating body such that the ceiling wall is held on the liquid surface.

* * * * *